United States Patent [19]
Passint et al.

[11] Patent Number: 5,581,705
[45] Date of Patent: Dec. 3, 1996

[54] MESSAGING FACILITY WITH HARDWARE TAIL POINTER AND SOFTWARE IMPLEMENTED HEAD POINTER MESSAGE QUEUE FOR DISTRIBUTED MEMORY MASSIVELY PARALLEL PROCESSING SYSTEM

[75] Inventors: Randal S. Passint; Steven M. Oberlin, both of Chippewa Falls; Eric C. Fromm, Eau Claire, all of Wis.

[73] Assignee: Cray Research, Inc., Eagan, Minn.

[21] Appl. No.: 166,443

[22] Filed: Dec. 13, 1993

[51] Int. Cl.$^6$ .......................... G06F 13/00; G06F 13/38; G06F 15/16; G06F 15/173

[52] U.S. Cl. ...................... 395/200.13; 395/200.14; 395/800; 395/250; 364/229; 364/229.5; 364/230.2; 364/931.41; 364/931.46; 364/940.67

[58] Field of Search .................. 395/200.14, 200.13, 395/800, 250

[56] References Cited

U.S. PATENT DOCUMENTS

| | | | |
|---|---|---|---|
| 4,933,933 | 6/1990 | Dally et al. | 370/60 |
| 4,965,793 | 10/1990 | Polzin et al. | 370/94.1 |
| 4,980,852 | 12/1990 | Giroir et al. | 395/775 |
| 4,995,056 | 2/1991 | Fogg, Jr. et al. | 375/220 |
| 5,008,882 | 4/1991 | Peterson et al. | 370/94.3 |
| 5,027,330 | 6/1991 | Miller | 365/239 |
| 5,036,459 | 7/1991 | DenHaan et al. | 395/200.14 |
| 5,068,784 | 11/1991 | Kishino et al. | 395/877 |
| 5,105,424 | 4/1992 | Flaig et al. | 370/94.1 |
| 5,157,692 | 10/1992 | Horie et al. | 375/38 |
| 5,161,156 | 11/1992 | Baum et al. | 395/182.02 |
| 5,218,676 | 6/1993 | Ben-Ayed et al. | 395/200.15 |
| 5,412,782 | 5/1995 | Hausman et al. | 395/250 |

FOREIGN PATENT DOCUMENTS

| | | |
|---|---|---|
| 0501524A2 | 5/1984 | European Pat. Off. . |
| 0460599A3 | 4/1991 | European Pat. Off. . |
| WO88/08652 | 4/1988 | WIPO . |

OTHER PUBLICATIONS

Tom McDonald et al., "Addressing in Cray Research's MPP Fortran", *Third Workshop on Compilers for Parallel Computers*, 161–172 (Jul. 7, 1992).

Erik DeBenedictis et al., "Extending Unix for Scalable Computing", *IEEE*, 43–53, (Nov. 1993).

Barbara Chapman et al., "Programming in Vienna Fortran", *Dept. of Statistics and Computer Science*, 121–160.

Compcon Spring '93, Feb. 22, 1993, San Francisco, CA, Bradley R. Carlile, "Algorithms and Design: The Cray APP Shared–Memory System," pp. 312–320.

*Primary Examiner*—Thomas C. Lee
*Assistant Examiner*—D. Dinh
*Attorney, Agent, or Firm*—Schwegman, Lundberg, Woessner & Kluth, P.A.

[57] ABSTRACT

A messaging facility is described that enables the passing of packets of data from one processing element to another in a globally addressable, distributed memory multiprocessor without having an explicit destination address in the target processing element's memory. The messaging facility can be used to accomplish a remote action by defining an opcode convention that permits one processor to send a message containing opcode, address and arguments to another. The destination processor, upon receiving the message after the arrival interrupt, can decode the opcode and perform the indicated action using the argument address and data. The messaging facility provides the primitives for the construction of an interprocessor communication protocol. Operating system communication and message-passing programming models can be accomplished using the messaging facility.

22 Claims, 18 Drawing Sheets

MESSAGE PACKET

| | $2^{63}$ $2^{48}$ | $2^{47}$ $2^{32}$ | $2^{31}$ $2^{16}$ | $2^{15}$ $2^{0}$ |
|---|---|---|---|---|
| N+7 | SOFTWARE CODE 0 | SOFTWARE CODE 1 | COMMAND | DESTINATION PE |
| N+6 | SOURCE PE | SOFTWARE CODE 0 | SOFTWARE CODE 1 | COMMAND |
| N+5 | SOFTWARE CODE 0 | SOFTWARE CODE 1 | COMMAND | DESTINATION PE |
| N+4 | SOURCE PE | SOFTWARE CODE 0 | SOFTWARE CODE 1 | COMMAND |
| N+3 | WORD 3 ||||
| N+2 | WORD 2 ||||
| N+1 | WORD 1 ||||
| N+0 | WORD 0 ||||

MEMORY ADDRESS

FIG. 5

PACKET TYPE 0

| | $2^{63}$ — $2^{48}2^{47}$ | $2^{32}2^{31}$ | $2^{16}2^{15}$ — $2^{0}$ |
|---|---|---|---|
| N+7 | NOT VALID DATA | NOT VALID DATA | DESTINATION PE |
| N+6 | NOT VALID DATA | NOT VALID DATA | †COMMAND |
| N+5 | NOT VALID DATA | †COMMAND | NOT VALID DATA |
| N+4 | NOT VALID DATA | †COMMAND | DESTINATION PE |
| N+3 | WORD 3 (DOES NOT CONTAIN VALID DATA) | | |
| N+2 | WORD 2 (DOES NOT CONTAIN VALID DATA) | | |
| N+1 | WORD 1 (DOES NOT CONTAIN VALID DATA) | | |
| MEMORY ADDRESS N+0 | WORD 0 (DOES NOT CONTAIN VALID DATA) | | |

† THE ERROR BIT (BIT $2^{15}$) IS NOT SET IN THESE COMMAND PHITS

FIG. 12A

PACKET TYPE 1

| | $2^{63}$ — $2^{48}2^{47}$ | | $2^{32}2^{31}$ | | $2^{16}2^{15}$ — $2^0$ |
|---|---|---|---|---|---|
| N+7 | REQUEST ADDRESS 0 | REQUEST ADDRESS 1 | †COMMAND | REQUEST ADDRESS 1 | DESTINATION PE |
| N+6 | SOURCE PE | REQUEST ADDRESS 0 | REQUEST ADDRESS 1 | | COMMAND |
| N+5 | REQUEST ADDRESS 0 | REQUEST ADDRESS 1 | †COMMAND | REQUEST ADDRESS 1 | DESTINATION PE |
| N+4 | SOURCE PE | REQUEST ADDRESS 0 | REQUEST ADDRESS 1 | | COMMAND |
| N+3 | WORD 3 (DOES NOT CONTAIN VALID DATA) | | | | |
| N+2 | WORD 2 (DOES NOT CONTAIN VALID DATA) | | | | |
| N+1 | WORD 1 (DOES NOT CONTAIN VALID DATA) | | | | |
| N+0 | WORD 0 (DOES NOT CONTAIN VALID DATA) | | | | |

MEMORY ADDRESS

† THE ERROR BIT (BIT $2^{15}$) IS NOT SET IN THESE COMMAND PHITS

FIG. 12B

PACKET TYPE 2

| MEMORY ADDRESS | $2^{63}$ — $2^{48}$ | $2^{47}$ — $2^{32}$ | $2^{31}$ — $2^{16}$ | $2^{15}$ — $2^{0}$ |
|---|---|---|---|---|
| N+7 | REQUEST ADDRESS 0 | REQUEST ADDRESS 1 | †COMMAND | DESTINATION PE |
| N+6 | SOURCE PE | REQUEST ADDRESS 0 | REQUEST ADDRESS 1 | COMMAND |
| N+5 | REQUEST ADDRESS 0 | REQUEST ADDRESS 1 | †COMMAND | DESTINATION PE |
| N+4 | SOURCE PE | REQUEST ADDRESS 0 | REQUEST ADDRESS 1 | COMMAND |
| N+3 | NOT VALID DATA | NOT VALID DATA | RESPONSE ADDRESS 0 | RESPONSE ADDRESS 1 |
| N+2 | NOT VALID DATA | NOT VALID DATA | RESPONSE ADDRESS 0 | RESPONSE ADDRESS 1 |
| N+1 | NOT VALID DATA | NOT VALID DATA | RESPONSE ADDRESS 0 | RESPONSE ADDRESS 1 |
| N+0 | NOT VALID DATA | NOT VALID DATA | RESPONSE ADDRESS 0 | RESPONSE ADDRESS 1 |

†THE ERROR BIT (BIT $2^{15}$) IS NOT SET IN THESE COMMAND PHITS

FIG. 12C

PACKET TYPE 3

| | $2^{63}$ — $2^{48}$ | $2^{47}$ — $2^{32}$ | $2^{31}$ — $2^{16}$ | $2^{15}$ — $2^{0}$ |
|---|---|---|---|---|
| N+7 | NOT VALID DATA | NOT VALID DATA | †COMMAND | DESTINATION PE |
| N+6 | NOT VALID DATA | NOT VALID DATA | NOT VALID DATA | COMMAND |
| N+5 | NOT VALID DATA | NOT VALID DATA | †COMMAND | DESTINATION PE |
| N+4 | NOT VALID DATA | NOT VALID DATA | NOT VALID DATA | COMMAND |
| MEMORY ADDRESS N+3 | WORD 0 | | | |
| N+2 | WORD 0 | | | |
| N+1 | WORD 0 | | | |
| N+0 | WORD 0 | | | |

† THE ERROR BIT (BIT $2^{15}$) IS NOT SET IN THESE COMMAND PHITS

FIG. 13A

PACKET TYPE 4

| | $2^{63}$ $2^{48}2^{47}$ | $2^{32}2^{31}$ | $2^{16}2^{15}$ $2^0$ | |
|---|---|---|---|---|
| N+7 | REQ/RES ADDRESS 0 | REQ/RES ADDRESS 1 | †COMMAND | DESTINATION PE |
| N+6 | SOURCE PE | REQ/RES ADDRESS 0 | REQ/RES ADDRESS 1 | COMMAND |
| N+5 | REQ/RES ADDRESS 1 | REQ/RES ADDRESS 1 | †COMMAND | DESTINATION PE |
| N+4 | SOURCE PE | REQ/RES ADDRESS 0 | REQ/RES ADDRESS 1 | COMMAND |
| N+3 | WORD 0 | | | |
| N+2 | WORD 0 | | | |
| N+1 | WORD 0 | | | |
| MEMORY ADDRESS N+0 | WORD 0 | | | |

† THE ERROR BIT (BIT $2^{15}$) IS NOT SET IN THESE COMMAND PHITS

FIG. 13B

PACKET TYPE 5

| MEMORY ADDRESS | $2^{63}$ — $2^{48}$ | $2^{47}$ — $2^{32}$ | $2^{31}$ — $2^{16}$ | $2^{15}$ — $2^{0}$ |
|---|---|---|---|---|
| N+7 | NOT VALID DATA | NOT VALID DATA | NOT VALID DATA | DESTINATION PE |
| N+6 | NOT VALID DATA | NOT VALID DATA | †COMMAND | COMMAND |
| N+5 | NOT VALID DATA | NOT VALID DATA | NOT VALID DATA | DESTINATION PE |
| N+4 | NOT VALID DATA | NOT VALID DATA | †COMMAND | COMMAND |
| N+3 | WORD 3 | | | |
| N+2 | WORD 2 | | | |
| N+1 | WORD 1 | | | |
| N+0 | WORD 0 | | | |

† THE ERROR BIT (BIT $2^{15}$) IS NOT SET IN THESE COMMAND PHITS

FIG. 13C

PACKET TYPE 6, MESSAGE PACKET, OR NACK PACKET

| | $2^{63}$ — $2^{48}$ $2^{47}$ | $2^{32}$ $2^{31}$ | $2^{16}$ $2^{15}$ — $2^{0}$ |
|---|---|---|---|
| N+7 | REQ/RES ADDRESS 0 | REQ/RES ADDRESS 1 | †COMMAND DESTINATION PE |
| N+6 | SOURCE PE | REQ/RES ADDRESS 1 | COMMAND |
| N+5 | REQ/RES ADDRESS 0 | REQ/RES ADDRESS 1 | †COMMAND DESTINATION PE |
| N+4 | SOURCE PE | REQ/RES ADDRESS 1 | COMMAND |
| N+3 | WORD 3 | | |
| N+2 | WORD 2 | | |
| N+1 | WORD 1 | | |
| MEMORY ADDRESS N+0 | WORD 0 | | |

† THE ERROR BIT (BIT $2^{15}$) IS NOT SET IN THESE COMMAND PHITS

FIG. 14

MESSAGING FACILITY WITH HARDWARE TAIL POINTER AND SOFTWARE IMPLEMENTED HEAD POINTER MESSAGE QUEUE FOR DISTRIBUTED MEMORY MASSIVELY PARALLEL PROCESSING SYSTEM

FIELD OF THE INVENTION

The invention relates generally to high performance massively parallel processing systems, and more specifically to a messaging facility which allows efficient emulation of a multicomputing system on a multiprocessing system.

BACKROUND OF THE INVENTION

Massively parallel processing (MPP) systems are computing systems comprised of hundreds or thousands of processing elements (PEs) individually interconnected by a common high-speed communication network. Many MPPs today are multicomputers, wherein each PE is considered a stand-alone computer with its own central processor, local memory, and associated control logic. In a multicomputer, each PE can only address its own local memory and cannot directly read or write the local memory associated with another PE. Each PE reads data from another PE's memory by sending a message and I/O-like packet, to the target PE requesting that some data from its memory be formatted and sent back to the requesting PE, or vice versa for writes. Thus, in a multicomputing system, each remote reference is essentially an I/O operation. This style of interprocessor communications is called "message passing". Message passing is a well-known and prevalent MPP programing model because multicomputers are relatively easy to build. The ease of construction of a multicomputer MPP arises from the use of commodity microprocessors in an environment that closely resembles their "natural habitat " (i.e., that hardware and software implementation envisioned by the microprocessor designers), that is, a network of small autonomous computers.

For many applications, however, a multiprocessor MPP is more desirable than a multicomputing MPP. In a multiprocessor MPP, every PE can directly address all of memory, including the memory of another (remote) PE, without involving the processor at that PE. Instead of treating PE-to-remote-memory communications as an I/O operation, reads or writes to another PE's memory are accomplished in the same manner as reads or writes to the local memory.

Multiprocessors have an ease-of-programming advantage over multicomputers. In a multicomputer, each communication between PEs must be explicitly coordinated and initiated by the programmer. In a multiprocessor, however, communications arise naturally and implicitly by the specification of variables and constants in program statements. If the data represented by the variable or constant name happens to reside in the memory of a remote PE, an access of the data there is automatically initiated the same manner as if the data were in local memory.

Software techniques are known which allow the emulation of a multiprocessor and its associated ease-of-programming on a multicomputer. Such software emulators translate the application program remote reads and writes into explicit I/O-like message-passing operations in a way that is hidden from the application programmer. Software of a global address space using message passing is very inefficient, however, because I/O-like operations have a large software start-up overhead associated with each message. Successful message passing programming models on multicomputers rely on relatively large granularity programming, passing large amounts of data with each communication, to amortize the startup overhead over many elements of data.

There is therefor a need in the art for a massively parallel processing system which has the desirable attributes of both a multiprocessing and multicomputing MPP's, and which further does not have the high-overhead and large granularity restrictions of present software manage of message passing techniques.

SUMMARY OF THE INVENTION

This can conceivably be a very efficient operation, potentially exceeding the performance of a true multicomputer when the granularity of communications is smaller. To support efficient message-passing in a multiprocessor, it is necessary to provide certain hardware primitives to allow one PE to send data to another PE's message queue and interrupt the target PE upon message arrival. The present invention addresses a need in the art for efficient message-passing emulation in a multiprocessor MPP system.

The present invention provides hardware support for a messaging facility in a multiprocessing MPP system to allow emulation of a multicomputing system on a multiprocessing MPP system. The messaging facility of the present invention enables the passing of packets of data from one PE to another without having an explicit destination address in the target PE's memory. A message is a special cache-line-size remote write that has as its destination a hardware-managed message queue in the memory of the receiving PE. Arriving messages are placed in the message queue in the order that they arrive by hardware mechanisms that also provide the lowest-level communication handshaking protocol service. Flow control between processors is accomplished by the queue management hardware, with software intervention used as necessary to deal with the error cases caused by queue overflows, etc.

Messages can be transmitted by user-level code. To alert the receiving PE when a message has arrived, all messages set an interrupt to the processor at the target node. Because the receiving of messages involves responding to the message-arrival interrupt, some system-level code must be executed to receive messages.

The messaging facility can be used to accomplish a remote action or initiate a remote procedure by defining an opcode convention that permits one processor to send a message containing opcode, address and arguments to another. The destination processor, upon receiving the message after the arrival interrupt, can decode the opcode and perform the indicated action using the argument address and data.

At the start of a program, a head and a tail pointer are initialized to point to the base of the queue, and a limit counter is initialized to a value representing the amount of available message space in the queue. When a message arrives at a node, it is copied in its entirety into sequential addresses starting at the address indicated by the tail pointer. The tail pointer is incremented after each message to point to the next message location in the queue. The limit counter, used by the flow control circuits to monitor queue space, is decremented as each message arrives to indicate that the queue is filling. An interrupt to the processor is set each time the tail pointer is incremented by a new arriving message. The receiving processor reads messages in the order they arrived by using the head pointer and must interpret any encoded commands and addresses in software to decipher the action requested by the message. The tail pointer can be read by the processor when servicing an interrupt to determine when the head has caught up (no more messages to service).

The messaging facility provides the primitives for the construction of a message-passing interprocessor communication protocol. The messaging facility allows use of operating system communication and message-passing programming models, such as the defacto-standard Parallel Virtual Machine (PVM) communication protocol.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which:

FIG. 5 shows the format of a message in the message queue;

FIGS. 12A–12C, 13A–C and 14 show the format of error messages as they are stored in the message queue.

DETAILED DESCRIPTION OF THE PREFFERED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

Figure 1:
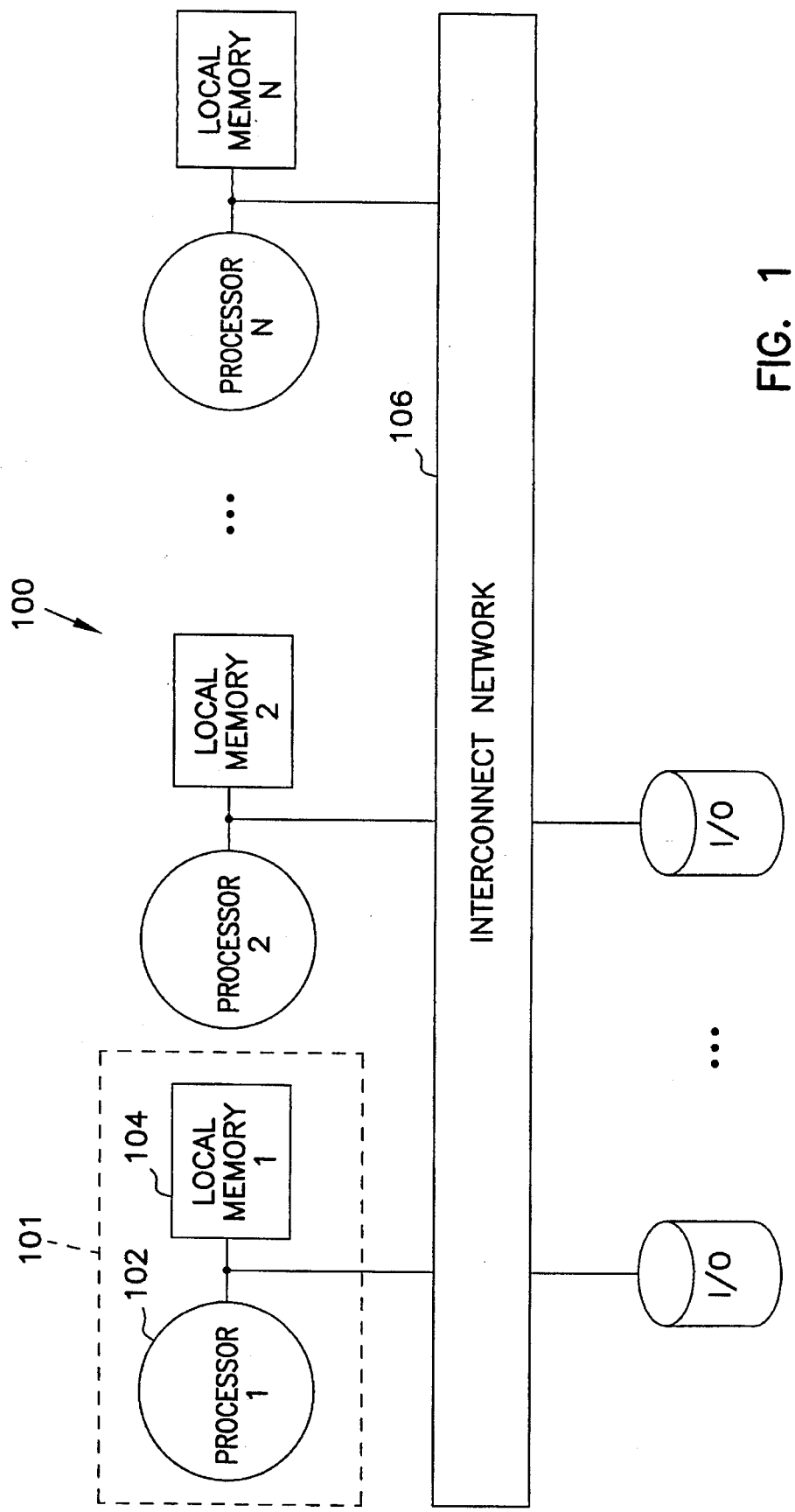
FIG. 1 shows a simplified block diagram of a representative MPP system with which the present address centrifuge can be used.

The preferred MPP system, for which the present invention provides an address centrifuge, is a MIMD massively parallel multiprocessor with a physically distributed, globally addressable memory. A representative MPP system is shown in FIG. 1.

Figure 2:
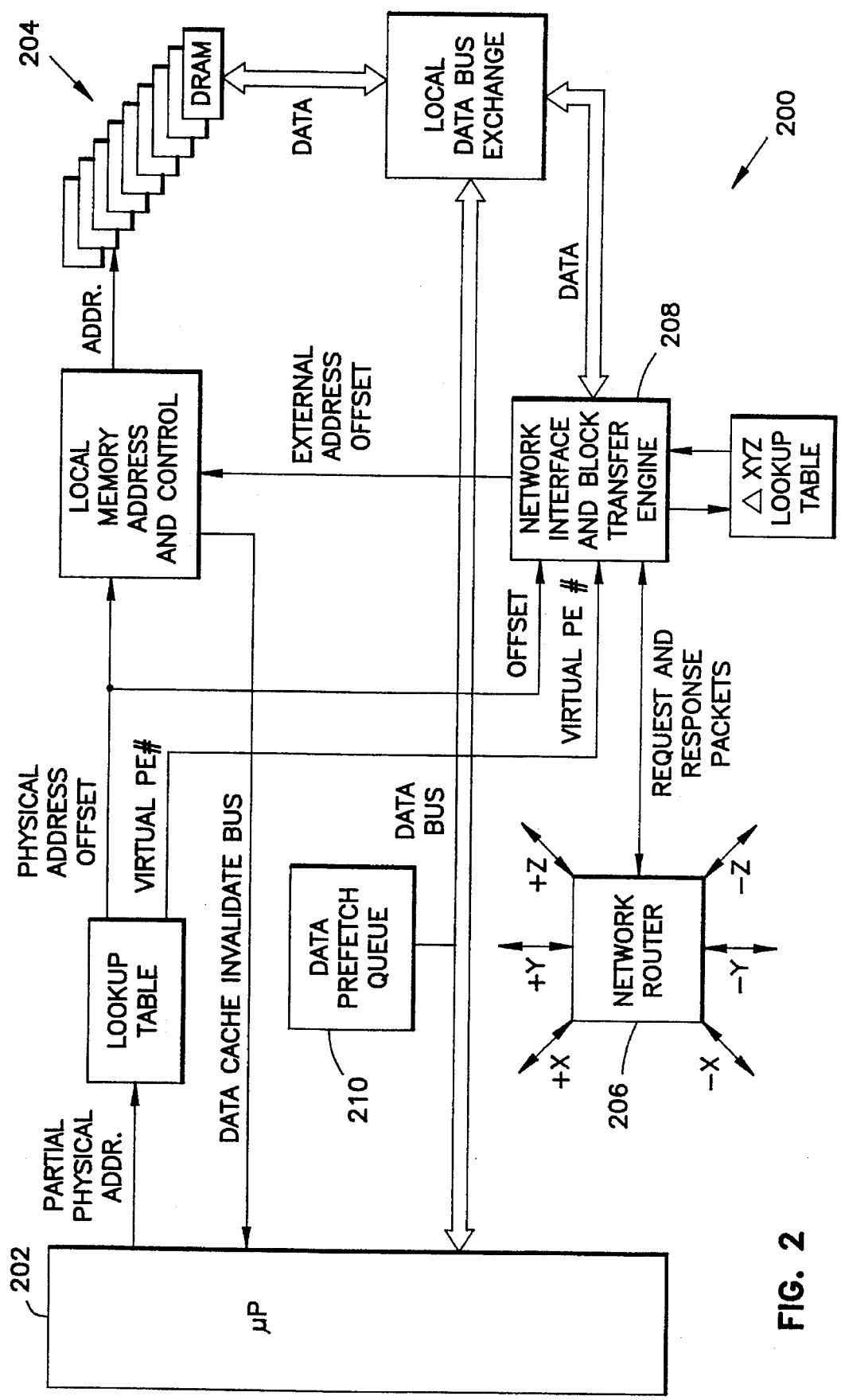
FIG. 2 shows a block diagram of a PE, including a processor and its associated shell circuitry.

FIG. 2 shows a simplified block diagram of a PE 200. An individual PE includes a high-performance RISC (reduced instruction set computer) microprocessor 202. In the preferred MPP system, microprocessor 202 is the DECChip 21064-AA RISC microprocessor, available from Digital Equipment Corporation. Each PE is coupled to a local memory 204 that is a distributed portion of the globally-addressable system memory, and includes a shell of circuitry that implements synchronization and communication functions facilitating interactions between processors.

The shell circuitry includes an interconnection network router 206, used to connect multiple PEs in the three-dimensional toroidal "fabric". The interconnection network carries all data communicated between PEs and memories that are not local. A block transfer engine 208 in the PE shell circuitry permits asynchronous (i.e., independent of the local processor) movement of data between the local memory 204 and remote memories associated with other PEs, such as block transfers, with flexible addressing modes that permit a high degree of control over the distribution of data between the distributed portions of the system memory. The flexible addressing scheme and address centrifuge are described in the copending and commonly assigned U.S. patent application entitled "ADDRESS CENTRIFUGE FOR DISTRIBUTED MEMORY MASSIVELY PARALLEL PROCESSING SYSTEMS " filed on even date herewith to Oberlin et al., and incorporated herein by reference. The shell circuitry also includes a data prefetch queue 210 which allows the processor 202 to directly initiate data movement between remote memories and the local processor in a way that can hide the access latency and permit multiple remote memory references to be outstanding.

Synchronization circuits in the shell permit synchronization at various different levels of program or data granularity in order to best match the synchronization method that is "natural " for a given parallelization technique. At the finest granularity, data-level synchronization is facilitated by an atomic swap mechanism that permits the locking of data on an element-by-element basis. A more coarse grain data-level synchronization primitive is provided by the present messaging facility, which permits a PE to send a packet of data to another PE and cause an interrupt upon message arrival, providing for the management of message queues and low-level messaging protocol in hardware. Control-level synchronization at the program loop level is provided by a large set of globally accessible fetch-and-increment registers that can be used to dynamically distribute work (in the form of iterations of a loop, for instance) among processors at run time. Yet another form of control-level synchronization, barrier synchronization, is useful to control transitions between major program blocks (i.e., between loops performing actions on the same data sets). The barrier mechanism is described in detail in the copending and commonly assigned U.S. Pat. No. 5,434,995 entitled "BARRIER SYNCHRONIZATION FOR DISTRIBUTED MEMORY MASSIVELY PARALLEL PROCESSING SYSTEMS," filed on even date herewith to Oberlin et al., which is incorporated herein by reference.

Messaging Facility Rationale

The present invention supports a message passing programming paradigm on the preferred MPP multiprocessor system. The messaging facility provides a means to write to another PE without indicating a specific address in the destination PE's memory. The message information is stored in a message queue in the destination PE's local memory. Upon message arrival the PE is interrupted to inform it that a message has arrived. Hardware at the receiving PE decodes a command field in the message, which informs the destination PE of the action which it is to take with respect to the message data payload.

The messaging facility has several advantages over conventional multicomputing message-passing mechanisms. First, the message send is extremely lightweight. In a multicomputer, as discussed above, a message send is very similar to an I/O operation. As is well known to those of skill in the art, I/O type requests require a significant amount of message formatting. In addition, substantial overhead is incurred from the call to the operating system required by an I/O type request to establish communications between the transmitting computer and the receiver. However, because the preferred MPP system is a multiprocessor, as opposed to a multicomputer, the target PE can instead be addressed directly and no I/O-type formatting is required. At the same time, normal shared global memory security hardware mechanisms assure that proper permission to communicate, etc., exists between the transmitting and the receiving processors.

The present messaging facility also incorporates hardware message queue management. Ordinarily, the message queue in memory must be managed and manipulated by software means, adding to the overhead associated with a message and increasing the granularity of the data transmission required to amortize the overhead.

The present messaging facility incorporates hardware flow control (handshaking) at the lowest level. This permits the application to efficiently send messages without consideration for flow control issues in the usual case. Only when message queues fill and an overflow or rejected packet occurs is the flow control responsibility turned over to software. The hardware flow control mechanism is designed so that all such error conditions are recoverable by software. The hardware flow control also reduces the overhead associated with message-passing, allowing still finer communication granularity to be profitably parallelized using message passing programming techniques.

The present messaging facility provides for the efficient passing of short messages by direct transmission. Long messages are passed between processors by direct transmission only of control information. The control information describes the size and location of the long message in the transmitting processor's memory. The receiving processor, upon decoding the control information, can efficiently access the long message where it resides due to the multiprocessor ability to directly address and reference remote memory. This has several advantages over traditional message-passing in a multi-computer: The latency of message transmission (the time from message send until the receiver begins acting on the first elements of the message) is significantly reduced. Only the control information need actually be sent before the receiver is alerted to the "arrival" of the message. The actual moving of the long message data to the receiver can be accomplished under the control of the receiver as part of a computation loop acting upon the data, thus hiding the latency of the message move. Data buffering requirements are also reduced, because the message may not actually ever have to be copied into the memory of the receiving processor.

Network Packets

Figure 3:
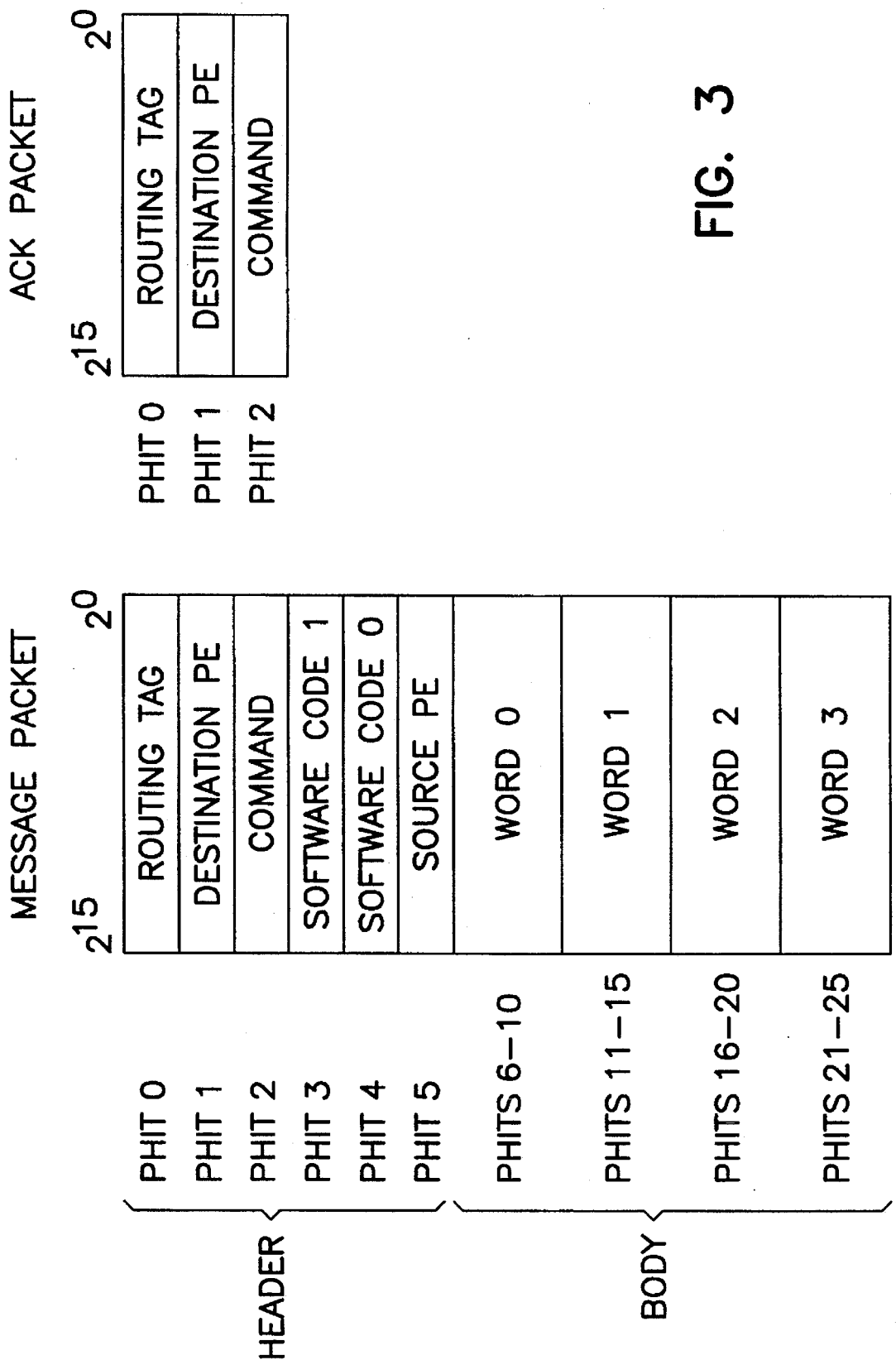
FIG. 3 shows the messaging facility packet format.

FIG. 3 shows the format of a message packet, which is the unit of information conveyed by the network between processors in the multiprocessing system. Message packets consist of two parts: A header containing control and address information, and the body, consisting of 4 words of data payload. The header consists of 4 parts:

1. Command
2. Destination PE number
3. Source PE number
4. Address

The command field is a twelve-bit field containing the packet type (e.g. load, store, message, NACK, etc.). Certain packet types, including the message packet, have an 8 bit subfield in the command that contains a half-word (32-bit) mask indicating valid data in the data field following the header. A message packet will typically carry a command with a mask of all ones (unless the message transmission is interrupted, causing message fragmentation, discussed later). Table 1 shows the encoding of the command field.

TABLE 1

| $2^{11}$ | $2^{10}$ | $2^9$ | $2^8$ | $2^7$ | $2^6$ | $2^5$ | $2^4$ | $2^3$ | $2^2$ | $2^1$ | $2^0$ | Packet Type |
|---|---|---|---|---|---|---|---|---|---|---|---|---|
| 1 | 1 | 1 | 1 | m | m | m | m | m | m | m | m | Message |
| 0 | 0 | 0 | 0 | 1 | 0 | 0 | x | x | x | x | x | ACK |
| 1 | 1 | 1 | 0 | m | m | m | m | m | m | m | m | NACK |

In Table 1, bits $2^{11}$ through $2^9$ of the command field indicate the type of packet the command is in. When set to 1, bit $2^8$ of the command field indicates the packet is a request. When set to 0, bit $2^8$ of the command field indicates the packet is a response.

Bits $2^7$ through $2^0$ of the command field contain an opcode that signals the support circuitry in the destination PE what type of operation to perform. In some cases, the opcode contains mask bits (m) that indicate which 32-bit halfwords in the data body of the packet contain valid data.

The twelve-bit destination PE number is part of the header, but is not used by the message handling software except as part of an error handling routine. The destination PE number is used by hardware to validate that network packets have been routed to the correct PE. The destination PE number represents a logical PE number in the preferred embodiment.

The source PE number is typically used to route replies back to the requesting PE. The hardware uses the source PE number to construct a new routing tag for the message ACK or NACK (discussed below) to the transmitting processor upon message arrival. The source PE number is twelve bits and preferably represents a logical PE number.

The 24-bit address is the partial physical address the transmitting processor used to send the message. The software opcodes are embedded in the address field. The address is split into two halves for transmission through the network, each 12 bits in size.

Message Payload

A message may in the preferred embodiment contain up to 32 bytes of information. Messages smaller than 32 bytes must be padded out to 32 bytes so that receiving software can distinguish between small messages and message fragments. Message fragmentation can be caused by an interrupt if it occurs during the performance of the 4 stores necessary to fill a write buffer during message transmission.

Messages larger than 32 bytes may be sent as a string of independent 32-byte messages. Above a certain threshold of message size, it will be faster and more efficient to only exchange protocol information using the messaging facility and move the data using other means. For instance, prior to moving a large block of data, a source processor might send a message requesting an allocation of storage at the destination. After allocating space for the large message, the destination PE can return a pointer to the allocated storage, either in a message, or by writing directly to a reply "pigeon hole" in the source PE's memory using a pointer passed as part of the request message. The sender may then directly copy the large message to the remote node at the allocated location, sending a final short message to indicate when the copy is done. Alternately, large messages can be moved by the receiver using address and size information passed in the protocol and control message sent by the transmitter detailing where the data resides in the transmitter s memory and how large the data block is.

Message Transmission

Messages are transmitted simply by writing a cache line to a special remote address. Messages are distinguished from ordinary remote cache-line writes by the mapping of the destination address. Special addresses are reserved in the physical memory address range to be interpreted as message transmission triggers. If a store is performed to the special address, hardware decodes the destination address to indicate that the store is actually a message send. PE support circuitry then creates a message packet and sends the packet into the interconnection network for routing to the destination PE.

In the preferred MPP system, messages are assembled in circuits on the microprocessor chip called "write buffers". The cache line write to the special address must be performed as sequential stores to addresses within the same cache line. The write buffers on the microprocessor attempt to assemble full cache lines before requesting a bus cycle and will succeed in most cases if no intervening memory references are made while sending a message. If the processor is interrupted while constructing the cache line message, the message will be sent as two incomplete cache lines in two separate messages (called message fragments). The half-word mask field in the message header must be examined by software upon receipt of a message to see if the entire message is present. If not, the receiving processor must defer processing of the message fragment until the remaining portions arrive.

In the preferred embodiment, it is important to have an understanding of the functioning of the microprocessor write buffers in order to ensure proper message transmission. There are 4 buffers, each a cache-line in size. At every store, the microprocessor checks all 4 buffers for a possible match between the address of the current store and one that may be pending in the write buffers. If a match is found, the write data is merged into its proper place in the cache line as indicated by the word-within-cache-line bits in the address. If there was data at that spot in the write buffer from a previous store with the same cache line address and word-within-cache-line pointer, the previous data is lost.

The DECChip microprocessor used in the preferred MPP system keeps the data in the write buffers for an indeterminate amount of time, unless specific steps are taken to flush them to the memory subsystem. One or more write buffers will flush if: A store is made to an address that matches none of the cache-line addresses currently in the write buffers, a memory barrier instruction is issued, or an exception or interrupt occurs. Barring any of these occurrences, the write buffers will still drain eventually, but the timing of the actual write is difficult to predict.

It can be seen that if multiple messages are sequentially sent to a particular processor, different special cache line addresses must be used for any five messages in a row, or unintentional merging of messages in the write buffers can occur.

Those skilled in the art can see that the message assembly functions of the write buffers could also easily be accomplished by buffers implemented external to the microprocessor if the microprocessor did not have write buffers or it was not desirable for some reason to use the onboard write buffers for message assembly.

Message Arrival

After receiving the message packet from the network router, the support circuitry in the destination PE attempts to store the message in the message queue. If the message queue can accept the message, the support circuitry stores the message in the queue and sets the message hardware interrupt for the receiving microprocessor.

The support circuitry in the destination PE then creates a message acknowledge (ACK) packet and sends the packet to the source PE. FIG. 3 also shows the format of an ACK packet and Table 1 above shows the format of the command field in an ACK packet.

Figure 4:
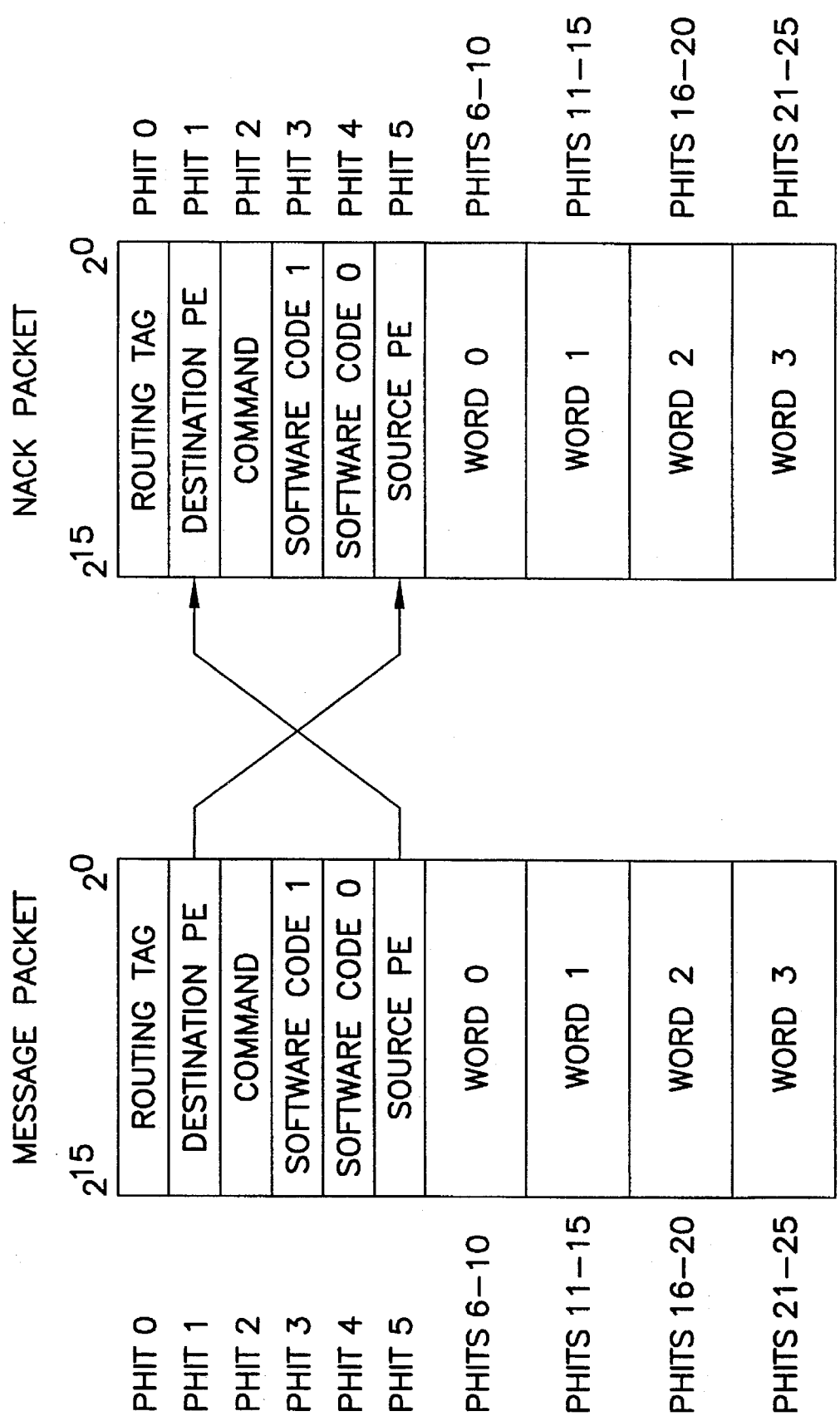
FIG. 4 shows the NACK packet format.

If the message queue in the destination PE cannot accept the message, the support circuitry returns the message to the requesting PE by creating a no-acknowledge (NACK) packet. A NACK packet contains the same information as the message packet; however, the NACK packet has the destination node and source phits exchanged, and bit 28 of the command field set to 0, as shown in FIG. 4. A phit is a minimal size packet. After receiving a NACK packet, the support circuitry in the PE that created the message stores the NACK in its own message queue. The message queue always contains room for NACK packets, as discussed below, and never rejects a NACK packet.

The processor that sent the message can then read the NACK from the message queue. Because the NACK contains all of the information that the original message did, the transmitting microprocessor can reconstruct and resend the original message, if desired. This process may repeat until the message is accepted and the transmitting support circuitry receives an ACK packet (instead of a NACK) which completes the message write.

Message Queue

After receiving a message packet, the support circuitry in a PE places the message in a designated location in local memory called the message queue, where arriving messages are stored prior to processing. The preferred message queue stores up to 4080 message, NACK, or error packets plus 16 reserved locations for a small amount of overflow (total of 256K bytes of information), although any desired size message queue could be selected in other implementations. The support circuitry places message packets in the message queue in the order that they are received. The message queue in the preferred embodiment is a first-in, first-out (FIFO) circular buffer.

When a message is transmitted, the support circuitry at the transmitting node reserves a location in its own local message queue. By reserving a message location in the local queue, the support circuitry guarantees that there will be room in the message queue in the event of receiving a NACK.

When a message is received from a remote node, the support circuitry stores the message in the next sequential location in the message queue. Likewise, when a NACK is received, the support circuitry stores the NACK in the message queue, consuming the space that was reserved when the original message was sent.

When an ACK is received, the support circuitry releases the space in the message queue reserved for a NACK. The reserved space is no longer needed after receiving an ACK.

In the preferred MPP system, the support circuitry contains a hardware counter and two memory-mapped registers used to control the message queue. The hardware counter, called the limit counter (MQ_LC), is a 13-bit up/down counter that indicates how many message slots in the message queue do not contain information or are not reserved for possible NACK packets. The limit counter cannot be read or written directly, but can be reset to 4079 when software writes any value to the message queue tail pointer (MQ_TP) memory-mapped register. The MQ_LC is the indicator of how much space is available in the message queue. The MQ_LC is initialized with the maximum message count for the selected queue size (minus some slack to allow for pipeline run-on after interrupt and error messages). Incrementing or decrementing the MQ_LC by one advances or retards the count of available space by one message. The MQ_LC is decremented by hardware each time a message is transmitted and incremented each time a message acknowledgment arrives. The MQ_LC is incremented by software for each message dequeued. If there is a simultaneous software-triggered increment and hardware triggered decrement, the counter does nothing. If there is a simultaneous software-triggered increment and hardware triggered increment, the MQ_LC increments by two.

The MQ_TP register is a 12-bit, readable and writable hardware counter that contains the tail pointer. The tail pointer is a value that represents the slot in the message queue where the next message that arrives will be stored. The actual memory offset represented by the tail pointer is calculated by multiplying the tail pointer by 64 and adding the result to the message queue base address. The value of the MQ_TP may be read and may be reset to 0. To reset the MQ_TP register to 0, software must write any value to the MQ_TP register.

When the MQ_TP is read, the MQ_TP returns the current value of the MQ_TP. When any value is written to the MQ_TP, the support circuitry resets the value of the MQ_TP to 0 and resets the message queue limit counter to 4079. Table 2 shows the bit format of the MQ_TP register and describes the bits in the register.

The message queue limit increment register (MQ_LIR) is a memory-mapped register that software uses to manipulate the limit counter. The MQ_LIR is a write-only pseudoregister that has no content. The MQ_LIR is used by software to advance the MQ_LC. Any store to the MQ_LIR causes the MQ_LC to increment by one message. The value stored to the MQ_LIR is irrelevant: The act of writing to that location triggers an atomic increment of the limit counter. When software writes any value to the MQ_LIR, the value of the limit counter increments by one. When software reads the value of the MQ_LIR, bit 212 of the MQ_LIR register contains the sign bit of the limit counter and the remaining bits are not defined.

Table 3 shows the bit format of the MQ_LIR register when it is read from and describes the bits in the register.

In addition to these hardware registers and counters, the messaging facility software must maintain a 12 bit head pointer. The head pointer indicates the location of the next message in the message queue that will be read by the microprocessor.

The support circuitry also controls the message and error hardware interrupts. The message interrupt indicates to the microprocessor that one or more message, NACK, or error packets have been stored in the message queue. The error interrupt indicates to the microprocessor that one or more errors have occurred.

The following sections describe how the registers, counters, and signals are used to control the messaging facility.

Message Queue Transmission Protocol

Figure 6:
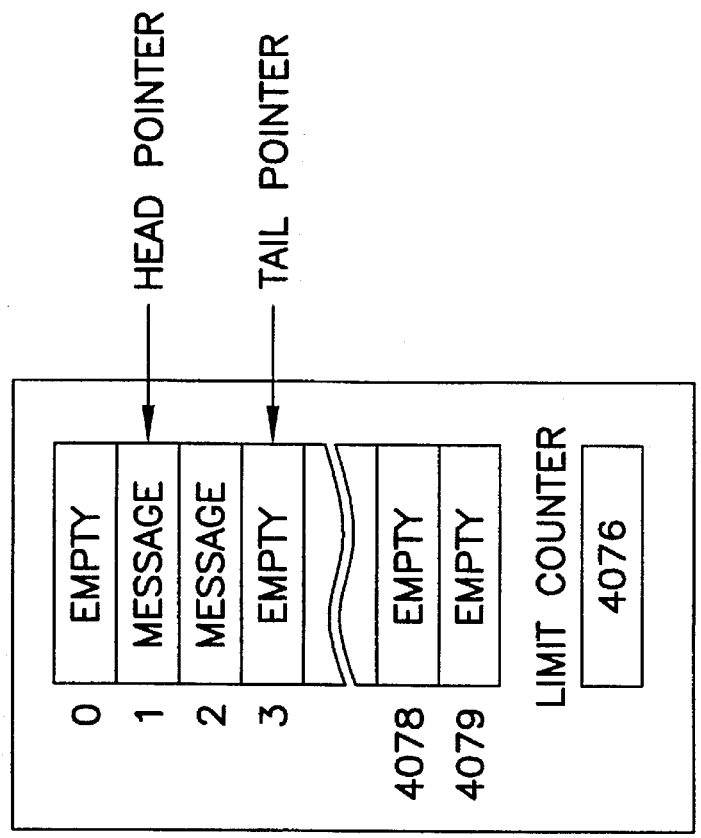
FIG. 6 shows a sample message queue before and after writing a message.
Figure 6:
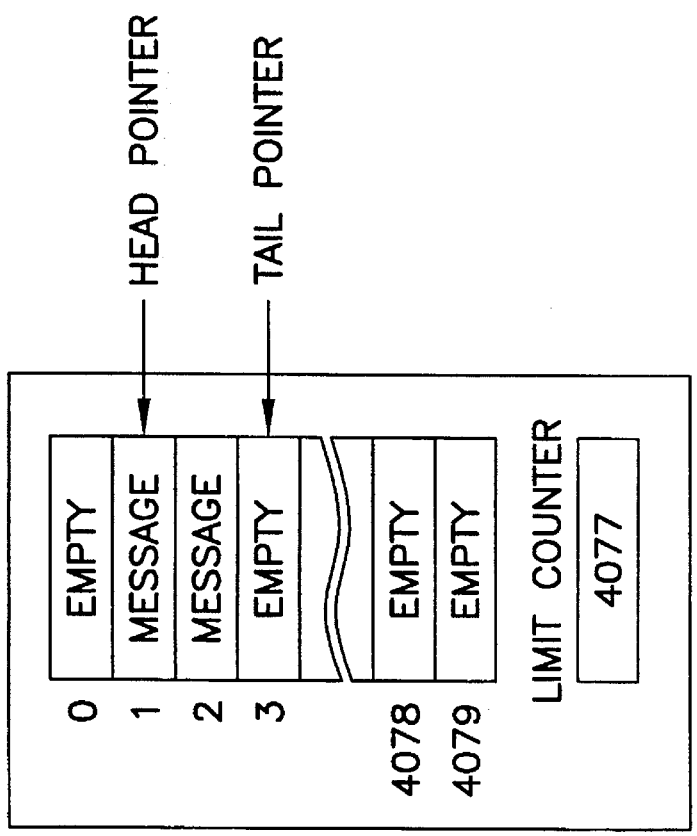

When the microprocessor signals the support circuitry that the microprocessor is writing a message, the support circuitry checks the value of the message queue limit counter. If the limit counter is greater than or equal to zero, the support circuitry decrements the limit counter by one. A transmitting PE must maintain room for returned messages in the message queue in the event that the destination message queue is full. The support circuitry in the source PE decrements the value of the limit counter to reserve a location in the message queue for each message transmitted. FIG. 6 shows a sample source message queue before and after sending a message. After decrementing the limit counter, the support circuitry sends a message packet to the destination PE. If the processor should attempt to transmit a message when the limit counter equals zero (no room for NACKs), the processor is interrupted with an error. This is referred to as a message queue full error.

Although the message queue full error exists, the support circuitry still decrements the limit counter by one and sends a message packet to the destination PE. If a message queue full error occurs, the operating system should immediately dispose of unread messages stored in the message queue to provide more space in the message queue.

Message Queue Arrival Protocol

When the support circuitry in a destination PE receives a message packet from the network router, the support circuitry first checks the value of the limit counter in the message queue. If the value of the limit counter is greater than zero, the support circuitry accepts the message. If the value of the limit counter is less than or equal to zero, the message queue is full and the support circuitry rejects the message.

Figure 7:
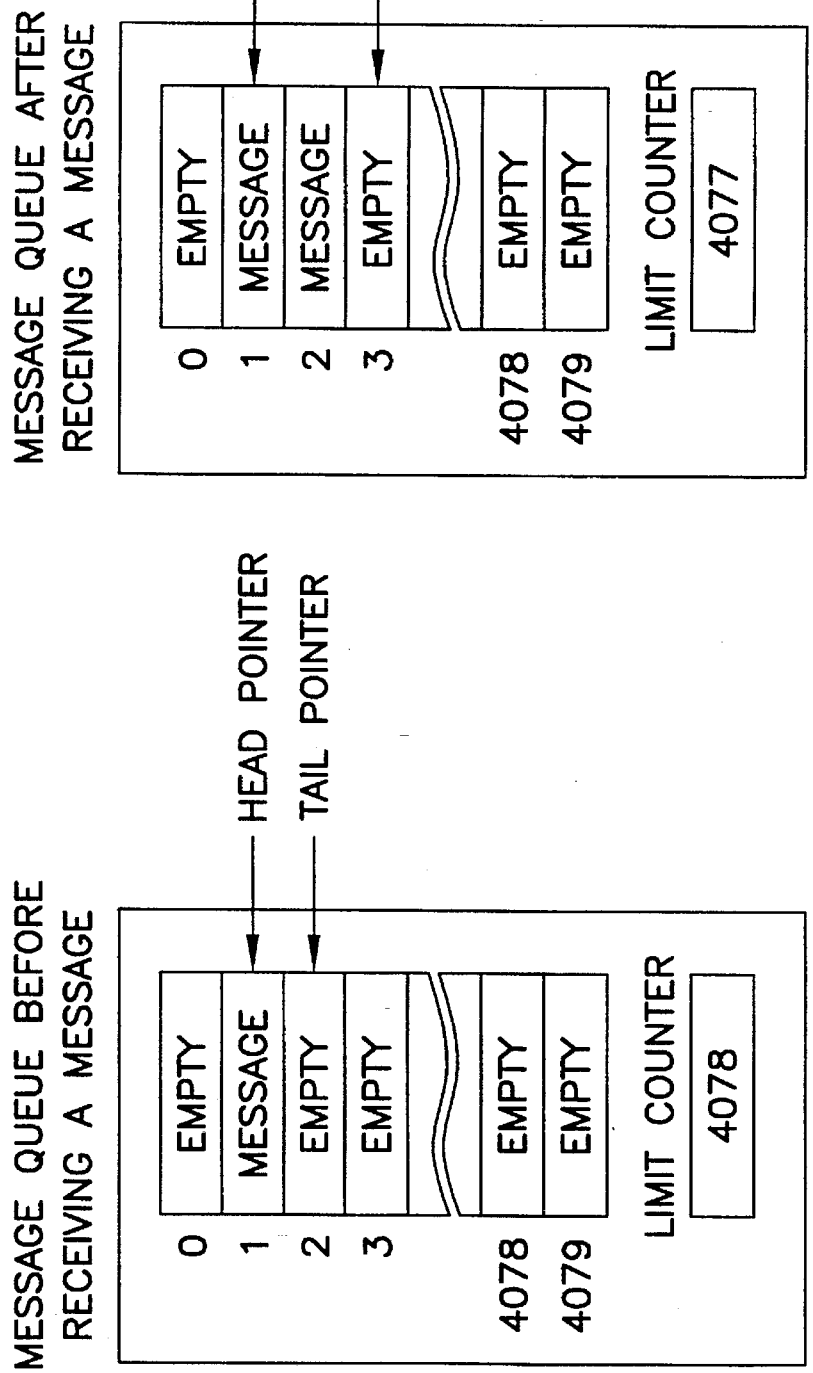
FIG. 7 shows a sample message queue before and after receiving a message.

FIG. 7 shows a sample destination message queue before and after receiving a message. When the support circuitry accepts a message, it stores the message in the message queue at the location pointed to by the tail pointer. After storing the message in the queue, the support circuitry increments the tail pointer, decrements the limit counter, and sets the Message hardware interrupt to the microprocessor.

Every message arrival interrupts the target processor for service. An arriving message sets a latch that asserts the Message Interrupt input to the EV-4. The latch remains set until it is cleared by a write to the MQ_LIR register.

In the normal course of operation, the processor would remain in the message handler routine until the head index pointer equaled the MQ_TP, meaning that the queue had been emptied, before returning to the user.

To avoid inadvertently missing a message arrival, the MQ_LIR write should be performed before the read of the MQ_TP and the comparison with the software head index pointer.

Figure 8:
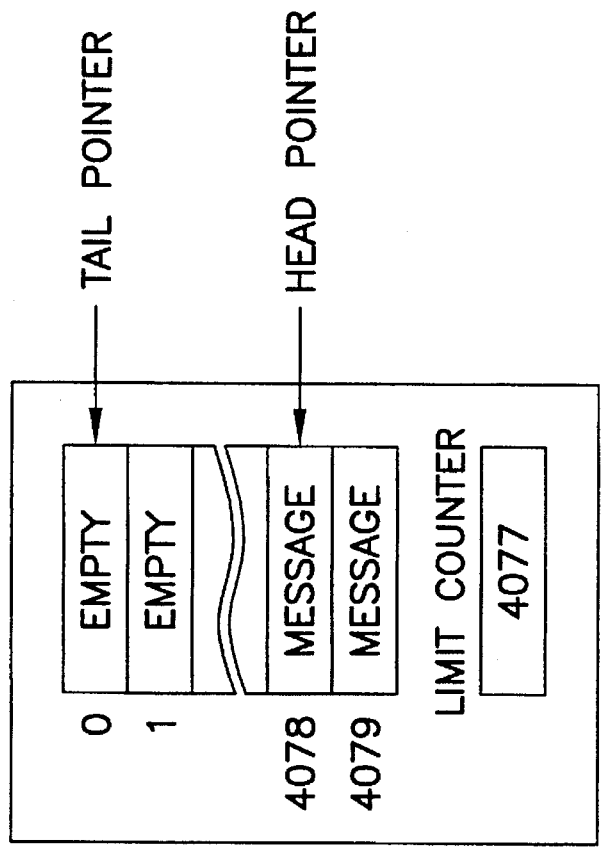
FIG. 8 shows a sample message queue before and after the tail pointer wraps to the first entry of the message queue.
Figure 8:
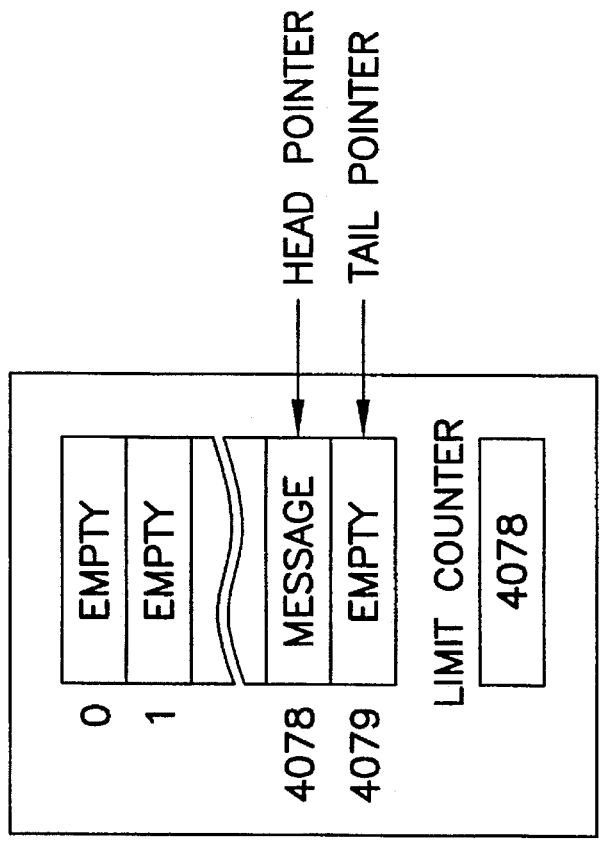

The tail pointer only increments. Because of this characteristic, if the tail pointer reaches the last entry in the message queue, the tail pointer automatically wraps to the first entry of the message queue when the support circuitry accepts another message. FIG. 8 shows a sample destination message queue before and after the tail pointer wraps to the first entry of the message queue. When the head pointer reaches the last entry in the message queue, software must reset the value of the head pointer to the beginning of the message queue.

After accepting the message, the support circuitry creates a message acknowledge (ACK) packet. The support circuitry sends a message ACK packet to the PE that sent the original message.

Figure 9:
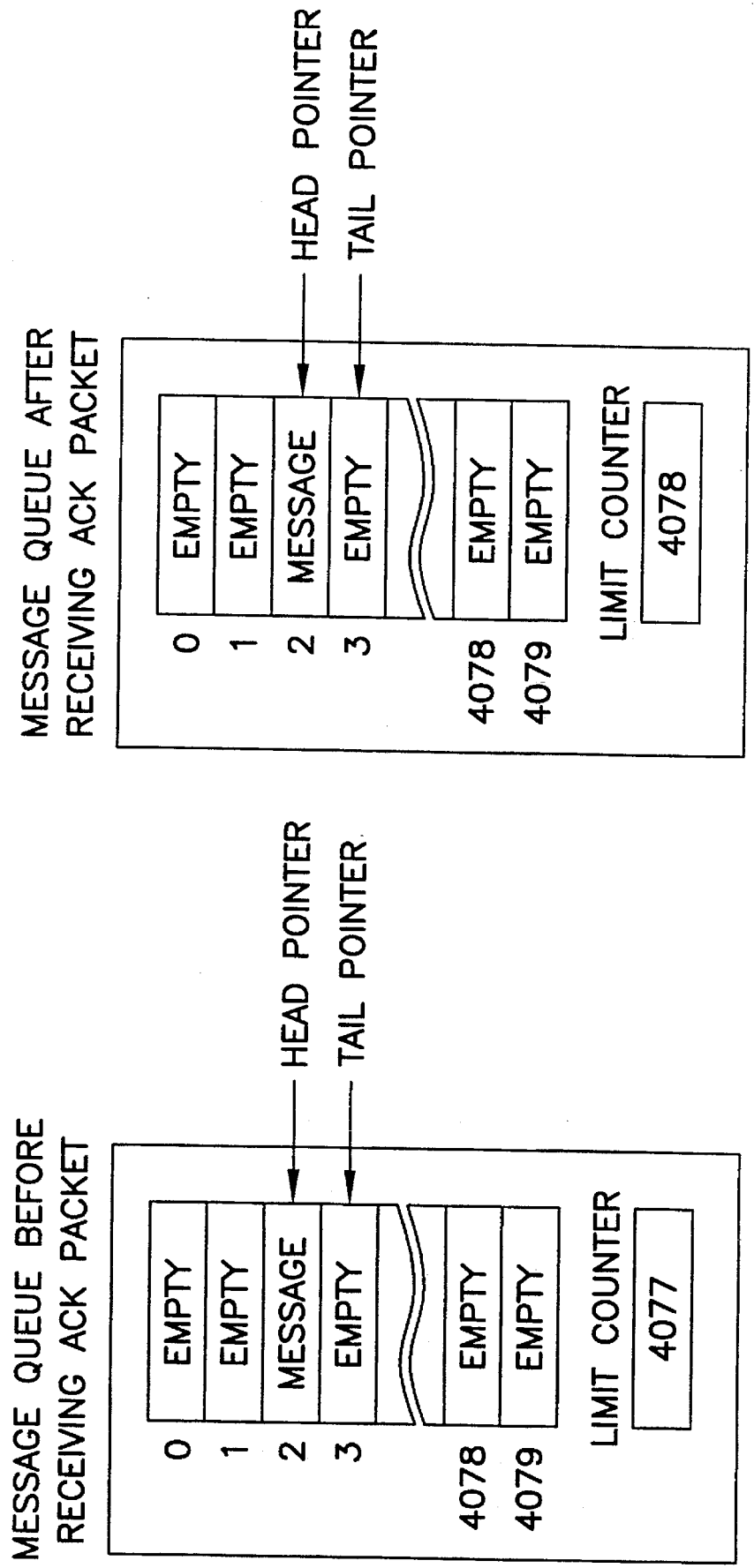
FIG. 9 shows a sample message queue before and after receiving an ACK packet.

After receiving the ACK packet, the support circuitry in the PE that sent the message increments the value of the limit counter to deallocate the slot on the message queue reserved for a possible NACK. Essentially decrementing the limit counter reserves space in the message queue for possible rejections, ACKs or NACKs release the reserved space. For example, FIG. 9 shows a sample source message queue before and after receiving an ACK packet.

By incrementing the value of the limit counter, the support circuitry frees up space in the message queue for sending or receiving another message. This action completes a successful message transfer from one PE to another.

As previously stated, when the support circuitry receives a message packet, the support circuitry first checks the value of the limit counter in the message queue. If the value of the limit counter is less than or equal to zero, the support circuitry rejects the message.

When the support circuitry in the destination PE rejects a message, it converts the message into a NACK packet. After converting the packet, the support circuitry sends the NACK packet to the PE that sent the original message.

Figure 10:
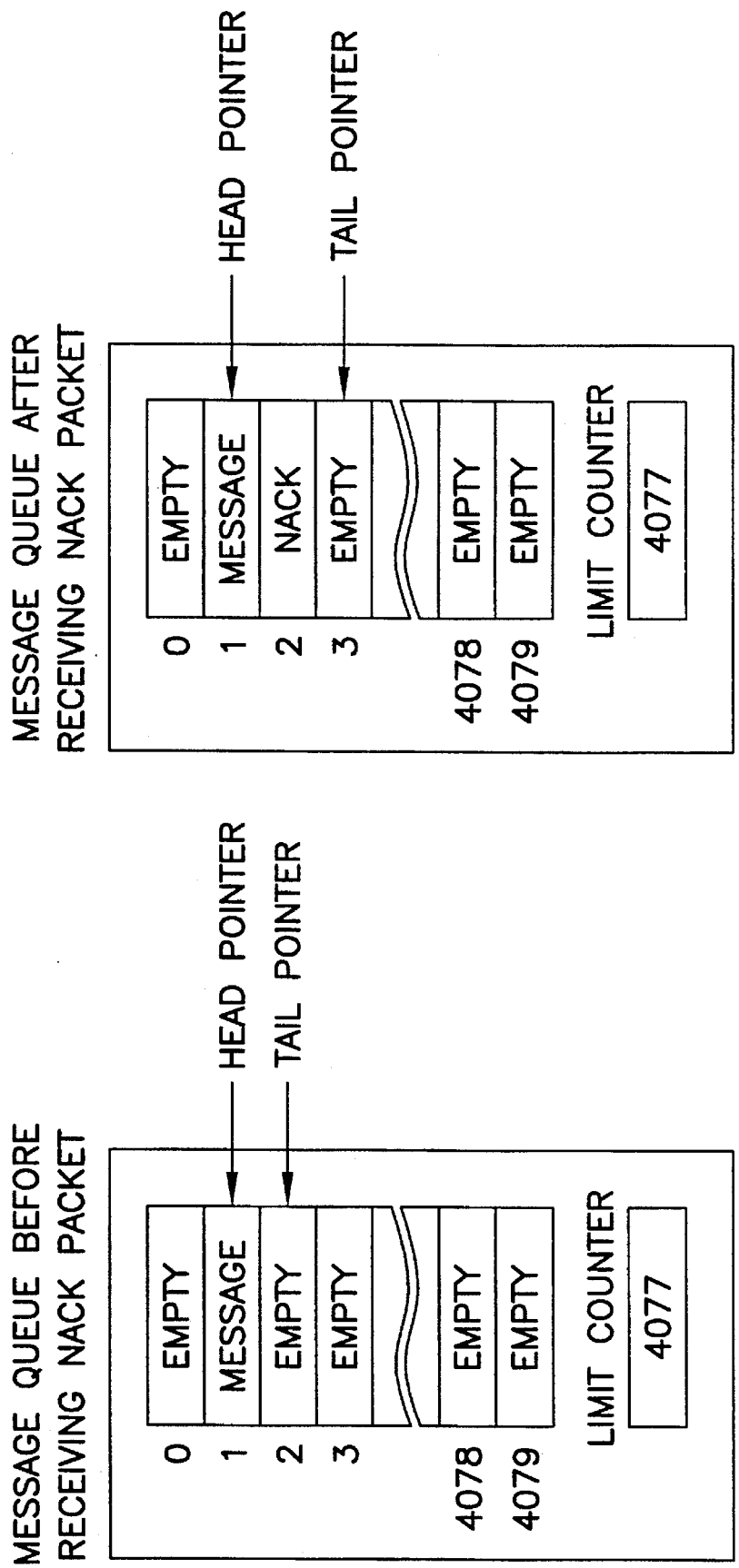
FIG. 10 shows a sample message queue before and after receiving a NACK packet.

FIG. 10 shows a sample source message queue before and after receiving a NACK packet. After receiving the NACK packet, the support circuitry in the PE that sent the message stores the NACK packet in the message queue at the location pointed to by the tail pointer. After storing the NACK packet in the queue, the support circuitry increments the tail pointer and sets the message hardware interrupt to the microprocessor.

When the microprocessor sent the original message, the support circuitry decremented the value of the limit counter. Because the limit counter was decremented at that time, the support circuitry does not decrement the limit counter when the support circuitry receives a NACK packet.

After the support circuitry sets the Message interrupt to the microprocessor, the microprocessor reads the NACK information from the message queue. The microprocessor then sends the message again to the destination PE.

Destination Message Processing

After the support circuitry stores a message packet, NACK packet, or error message in the message queue, the support circuitry sets the Message hardware interrupt to the microprocessor. This signals the microprocessor that one or more message facility packets have arrived and are stored in the message queue.

Figure 11:
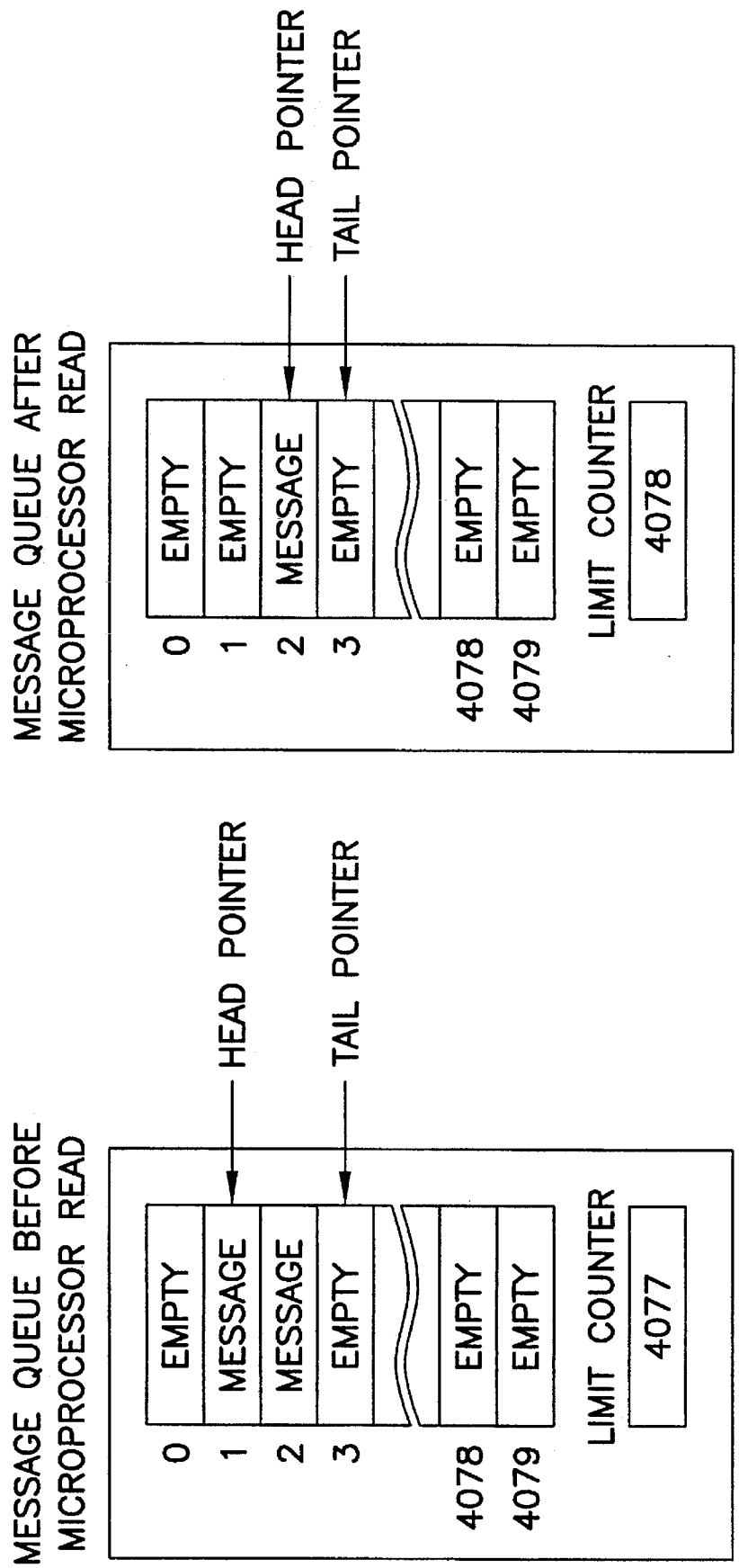
FIG. 11 shows a sample message packet before and after the microprocessor reads a message or NACK packet from the queue.

The microprocessor may then read the message, NACK, or error message packet from the message queue and interpret the software code, encoded commands, or addresses to decipher the action requested by the message. FIG. 11 shows a sample message queue before and after the microprocessor reads a message or NACK packet from the queue. After reading a packet from the message queue, the microprocessor increments the software-controlled head pointer and increments the limit counter by writing any value to the $MQ_{13}LIR$ register. When the microprocessor increments the limit counter, the support circuitry clears the Message hardware interrupt.

Normally, after the microprocessor receives the Message hardware interrupt, the microprocessor continues to read messages from the message queue until the value of the head pointer equals the value of the tail pointer. This indicates to the microprocessor that there are no more messages or NACK packets in the message queue.

To avoid missing a message arrival, the microprocessor should increment the limit counter before comparing the value of the tail pointer and the head pointer. The limit counter is incremented by writing any value to the $MQ_{13}LIR$ register.

A break-down of the actions involved in messaging, and the effect on the Head, Tail, and Limit counters follows (T=Tail, H=Head, L=Limit, +1 or −1 means increment by message size):

WRITE (send message):
If (L<=0) FAULT—interrupt local processor
L=L−1
MESSAGE ARRIVAL:
If (L<=0) NACK—return message to sender
Else T=T+1—set message interrupt
L=L−1
RECEIVE MESSAGE (process message interrupt):
Read data(H)
H=H+1 (wrap if necessary)
L=L+1
ACK ARRIVAL:
L=L+1
NACK ARRIVAL (rejected message):
L=L+1
T=T+1—set message interrupt

Error Handling

Three types of error conditions can be checked for in the preferred embodiment. First, message packet information could be corrupted during transit of the message from the source to the destination PE. Second, a PE could attempt to write a message into its message queue when the message queue is already full. Finally, a message could be misrouted through the torus network and arrive at the wrong destination PE.

Message Memory Error Checking

FIG. 5 illustrates the placement of the 12-bit command, source, destination, or address fields in the 16 bit parcels as stored in the message queue. The body of the packet is stored in memory locations n through n+3. Several copies of the header phits of the packet are stored in memory locations n+4 through n+7. The message payload data is preferably stored into the local memory in the message queue locations with valid Single Error Correction, Double Error Detection (SECDED) check bits as generated by the transmitting processor. If a memory error occurs in the message queue DRAM that holds the data, it will be detectable when the processor loads the data.

The message header is not accompanied by SECDED check bits. Instead, each 16-bit parcel of the header has two bits of parity in bit positions $2^{12}$ and $2^{13}$. Bit $2^5$ is normally a zero. Bit $2^{14}$ is always zero. Bit $2^{15}$ is set to a one in the command parcels to indicate when a network error has occurred, to distinguish between messages and network error messages.

Although the parity bits in the header phits of the message packet enable the network interface to check if an error occurred during a transfer, the microprocessor does not use the parity bits to check if an error occurred while reading the header phits from the message queue. To allow the microprocessor to detect errors when reading header phits from the message queue, the support circuitry places several copies of the header phits in the message queue.

To check for errors in the header phits, message handling software compares the word of header phit information stored at location N+4 with the word of header phit information stored at location N+6 using a bit-wise exclusive—OR. Likewise, message handling software compares the word of header phit information stored at location N+5 with the word of header phit information stored at location N+7 (refer again to FIG. 5).

If the word in location N+4 matches the word in location N+6 and the word in location N+5 matches the word in location N+7, the header phits of the packet were not corrupted when transferring from the message queue to the microprocessor. If the words do not match, one or more of the header phit bits changed value while being transferred from the message queue to the microprocessor.

If the message handling software detects an error, the software must determine which header phits contain an error. To do this, the software examines each header phit in the word read from the message queue and generates a new set of parity bits for the header phit. If the new parity bits match the parity bits read from the message queue, the header phit is not corrupted. If the new parity bits do not match the parity bits read from the message queue, the header phit is corrupted.

When the microprocessor reads the body of the message from the message queue, the microprocessor signals the support circuitry that it wants to perform SECDED on the words. The support circuitry then sends the body of the message to the microprocessor with a data acknowledge code that causes the SECDED hardware in the microprocessor to be enabled to detect and/or correct errors in the message data.

Queue-Full Error

It is possible for the microprocessor to be notified of a message queue full error when there are still up to four messages in the write buffer. When the microprocessor receives an interrupt that indicates the queue full error, the microprocessor empties the write buffer.

As the support circuitry receives each of the four message writes from the microprocessor, the support circuitry decrements the message queue limit counter in preparation for possible NACK packets and sends the messages to the destination PE's. In this case, the value of the limit counter continues to go negative with each message sent. The negative value indicates that the message queue is fully subscribed and any NACK packet received will be stored in one of the 16 reserved locations for overflow packets.

In addition to possible NACK packets from messages that were stored in the write buffer, the support circuitry may receive an error message at any time. When the support circuitry receives an error message and the message queue is full, the support circuitry still stores the error message in the message queue and decrements the limit counter by one. Because the limit counter is all ready negative, this also uses one of the reserved 16 slots in the message queue for overflow packets.

Another condition that could possibly occur is when a PE issues 4080 message writes and has not yet received any ACK packets. In this case the message queue is full but empty. If this occurs, software must periodically read the value of the MQ_LIR register and examine bit 212 of the register.

If this bit is set to 1, the value of the limit counter is negative and no more message writes should be issued. If this bit is set to 0, the value of the limit counter is positive and message writes may be issued.

If a queue full condition exists (MQ_LC<=0) and a processor attempts to send a message, the Error Interrupt.

Because the processor could have message waiting to be sent at the time the queue-full condition is detect, surplus room in the local queue ("slack") is maintained to allow the allocation of space for possible NACKs from the waiting messages.

Slack is established by initializing the MQ_LC with a value slightly smaller than the maximum available queue space. MQ_LC is allowed to go negative when a queue full transmission is detected, but only to allow for the transmission of the backed-up messages. Messages arriving from external nodes are rejected when the MQ_LC is less than or equal to zero. NACKs and ACKs may arrive at any time regardless of the value of the MQ_LC.

The amount of slack required to account for queuefull pipeline run-on can be computed by adding up the processor write buffers, which hold outgoing message data before they are transmitted through the torus network (4 in the preferred microprocessor), plus the erroring message at the external bus interface (1), plus additional writes that may be in the load/store pipeline behind the write-buffers (3 stores, equal to one more message fragment) for a total of 6 in the preferred embodiment.

Additional slack needs to be included to provide room for network error messages (see the next section).

Network Error Messages

There are two types of network packet errors: a misrouted packet error and a packet parity error. If the network interface receives a packet and the value of the destination phit does not match the value for the destination PE, a misrouted packet error occurs. If the network interface detects a parity error in the header phit of a packet, a packet parity error occurs. The header parcel parity bits are checked by the network interface hardware upon the arrival of any packet type. If any parity does not agree with the transmitted parity bits, the packet is converted by hardware into a network error message and stored in the message queue.

The message handling software can determine if a message is an error message by testing bit $2^{15}$ of the command parcel.

In the case of a misroute packet error, the receiving PE can attempt to retransmit the message to the appropriate destination PE. Thus in this case, the error need not necessarily result in a system failure.

Virtually all network failures that are detected using the header parity are fatal. The information captured in the message queue is intended to be an aid to troubleshooting rather than provide a means for overall system recovery.

If either network packet error occurs, the network interface turns the packet it received into an error message by setting bit $2^{15}$ of the command phit to 1. The network interface then sends the error message to the appropriate PE in the node.

The error message is treated as if it were an arriving message, regardless of the packet type. It is stored into the message queue by the network interface hardware and the error interrupt to the processor asserted. No ACK is sent.

Only the first error packet is captured. Further error messages are simply discarded until the error condition is cleared by software.

Because a network error message may occur at any time, including when a queue full condition already exists, room for an additional message must be provided for in the slack computation to allow the error message to be absorbed. This brings the slack total to 7 messages.

The network interface may create an error message out of any of the seven packet types, the message packet, ACK packet, or the NACK packet. FIGS. 12A–12C, FIGS. 13A–13C, and FIG. 14 show the format of error messages as they are stored in the message queue.

We claim:

1. A messaging facility in a multiprocessor computer system having a plurality of processing elements interconnected by a n-dimensional interconnect network, each processing element including a processor and a local memory, wherein globally addressable portions of local memory of each processing element form a distributed memory, the messaging facility comprising:

assembling means in a source processing element for assembling a message to be sent from the source processing element to a destination processing element based on information provided from the source processing element's processor;

a network router for transmitting the assembled message from the source processing element to the destination processing element via the interconnect network;

a message queue in a designated area of the local memory of the destination processing element for storing the transmitted message;

tail pointer hardware circuitry for indexing into the message queue to indicate a location where the transmitted message is to be stored in the message queue;

interrupt hardware circuitry in the destination processing element for providing an interrupt to the destination processing element's processor in response to the message being stored in the message queue; and message facility software providing a head pointer for indexing into the message queue to indicate a location where the message is stored in the message queue for reading by the destination processing element's processor in response to the interrupt.

2. The messaging facility of claim 1 further comprising:

a queue limit counter to provide a limit count representative of the remaining available locations in the message queue.

3. The messaging facility of claim 2 further comprising:

means for generating an acknowledged message based on the limit count indicating that there is an available location for storing the transmitted message and for generating a not acknowledged message based on the limit count indicating that there are no available locations for storing the transmitted message.

4. The messaging facility of claim 2 further comprising:

means for causing the queue limit counter to increment the limit count as messages are read from the message queue; and means for causing queue limit counter to decrement the limit count as messages are stored in the message queue.

5. The messaging facility of claim 3 wherein the source processing element includes a message queue and a queue limit counter and wherein the messaging facility further comprises:

means for causing the queue limit counter of the source processing element to decrement the limit count after the message is assembled in the assembling means to thereby reserve a location in the message queue of the source processing element for a not acknowledged message generated by the destination processing element in response to the transmitted message.

6. The messaging facility of claim 5 further comprising:

means for causing the queue limit counter of the source processing element to increment the limit count in response to receiving an acknowledged message from the destination processing element indicating that the destination processing element accepted the transmitted message.

7. The messaging facility of claim 1 wherein the tail pointer hardware circuitry circularly indexes the message queue.

8. The messaging facility of claim 7 wherein the message queue is a first-in, first-out circular buffer.

9. The messaging facility of claim 1 farther comprising:

means for detecting possible error conditions and for providing an error interrupt to the destination processing element's processor in response to detecting an error condition.

10. The messaging facility of claim 9 wherein the means for detecting includes:

means for detecting error conditions resulting from a message being corrupted during the transmission from the source processing element to the destination processing element;

means for detecting that the message queue is full when the message is to be stored in the message queue; and means for detecting that the message has been misrouted through the interconnect network and is at the wrong destination processing element.

11. The messaging facility of claim 9 wherein one type of possible error condition results from a message being corrupted during the transmission from the source processing element to the destination processing element and wherein the messaging facility further comprises:

means for responding to an error condition indicating that the transmitted message is corrupted to transform the corrupted message into an error message to be stored in the message queue for retrieval during software error recovery.

12. A method of passing messages in a multiprocessor computer system having a plurality of processing elements interconnected by a n-dimensional interconnect network, each processing element including a processor and a local memory, wherein globally addressable portions of local memory of each processing element from a distributed memory, the method comprising:

assembling a message to be sent from the source processing element to a destination processing element based on information provided from the source processing element's processor;

transmitting the assembled message from the source processing element to the destination processing element via the interconnect network;

indexing, with hardware circuitry, into a designed area of the local memory of the destination processing element's local memory to indicate a location where the transmitted message is to be stored;

storing the transmitted message in the indexed location in the designated area of the local memory of the destination processing element;

generating an interrupt, with hardware circuitry in the destination processing element to the destination processing element's processor in response to the message being stored in the indexed location; and indexing, with message facility software, into the designated area of the local memory of the destination processing element's local memory to indicate a location where the message is stored for reading by the destination processing element's processor in response to the interrupt.

13. The method of claim 12 further comprising the step of providing a limit count representative of the remaining available locations in the designated area of the local memory of the destination processing element.

14. The method of claim 13 further comprising the steps of generating an acknowledged message based on the limit count indicating that there is an available location for storing the transmitted message and generating a not acknowledged message based on the limit count indicating that there are no available locations for storing the transmitted message.

15. The method of claim 13 further comprising the steps of incrementing the limit count as messages are read from the designated area of the local memory of the destination processing element and decrementing the queue limit count as messages are stored in the designated area.

16. The method of claim 14 further comprising the steps of generating a second limit count representative of the remaining available locations in the designated area of the local memory of the source processing element, of decrementing the second limit count after the message is assembled in the buffer means to thereby reserve a location in the designated area of the local memory of the source processing element for a not acknowledged message generated by the destination processing clement in response to the transmitted message.

17. The method of claim 16 further comprising the steps of incrementing the second limit count in response to receiving an acknowledged message from the destination processing element indicating that the destination processing element accepted the transmitted message.

18. The method of claim 12 wherein the step of indexing into a designated area includes the step of circularly indexing into the designated area after indexing through a selected location in the designated area.

19. The method of claim 12 further comprising the steps of detecting possible error conditions and providing an error interrupt to the destination processing element's processor in response to detecting an error condition.

20. The method of claim 19 wherein the step of detecting includes detecting error conditions resulting from a message being corrupted during the transmission from the source processing element to the destination processing element, detecting that the designated area is full when the message is to be stored in the designated area, and detecting that the message has been misrouted through the interconnect network and is at the wrong destination processing element.

21. The method of claim 19 wherein one type of possible error condition results from a message being corrupted during the transmission from the source processing element to the destination processing element and wherein the method further comprises the step of transforming the corrupted message into an error message to be stored in the message queue for retrieval during software error recovery.

22. A multiprocessor computer system comprising:

a plurality of processing elements, each processing element including a processor, a local memory having a designated message queue area, and shell circuitry, each shell circuitry including:

assembly means for assembling a message to be sent from a source processing element to a destination processing clement based on information provided from the source processing element's processor, a network router for transmitting the assembled messages from the source processing element to the destination processing element via the interconnect network to be stored in the designated message queue area of the local memory of the destination processing element, tail pointer circuitry to index into the designated message queue area of the local memory of the destination processing element to indicate a location where the transmitted message is to be stored, and interrupt circuitry providing an interrupt to the destination processing element's processor in response to the message being stored in the designated message queue arae;

messaging facility software providing head pointers to indicate locations where messages are stored in the designated message queue areas of the local memories of the destination processing elements for reading by the destination processing element's processors in response to the interrupts from the destination processing element's interrupt circuitry; and a n-dimensional interconnect network interconnecting the plurality of processing elements.

* * * * *

UNITED STATES PATENT AND TRADEMARK OFFICE
CERTIFICATE OF CORRECTION

PATENT NO. : 5,581,705
DATED      : December 3, 1996
INVENTOR(S): Rnadal S. Passint et al.

It is certified that error appears in the above-identified patent and that said Letters Patent is hereby corrected as shown below:

At Column 16, line 31, please delete "claim 1 farther comprising" and insert --claim 1 further comprising--.

At Column 16, line 63, please delete "from" and insert --form--.

At Column 17, line 47, please delete "clement" and insert --element--.

At Column 18, line 27, please delete "assembly" and insert --buffer--.

At Column 18, line 29, please delete "clement" and insert --element--.

At Column 18, line 51, please delete "element's" and insert --elements'--.

Signed and Sealed this

Seventeenth Day of March, 1998

Attest:

BRUCE LEHMAN

Attesting Officer

Commissioner of Patents and Trademarks